United States Patent
Watanabe

(10) Patent No.: US 8,269,452 B2
(45) Date of Patent: Sep. 18, 2012

(54) BATTERY CHARGE MONITORING DEVICE

(75) Inventor: Jin Watanabe, Toyota (JP)

(73) Assignee: Yazaki Corporation, Tokyo (JP)

( * ) Notice: Subject to any disclaimer, the term of this patent is extended or adjusted under 35 U.S.C. 154(b) by 511 days.

(21) Appl. No.: 12/497,047

(22) Filed: Jul. 2, 2009

(65) Prior Publication Data

US 2010/0001687 A1   Jan. 7, 2010

(30) Foreign Application Priority Data

Jul. 4, 2008  (JP) ................. 2008-175615
Jul. 4, 2008  (JP) ................. 2008-175616

(51) Int. Cl.
*H02J 7/14*     (2006.01)
*B60K 6/20*    (2007.10)
*B60W 10/00*   (2006.01)

(52) U.S. Cl. ........ 320/104; 903/903; 903/904; 903/907; 180/65.21; 180/65.265; 180/65.275

(58) Field of Classification Search .................... 320/104
See application file for complete search history.

(56) References Cited

U.S. PATENT DOCUMENTS

| | | | |
|---|---|---|---|
| 5,399,446 A | 3/1995 | Takahashi | |
| 6,762,572 B1 | 7/2004 | Ishii et al. | |
| 7,928,696 B2 * | 4/2011 | Odaohhara et al. | ........... 320/134 |
| 2009/0278492 A1 * | 11/2009 | Shimizu et al. | ............... 320/108 |

FOREIGN PATENT DOCUMENTS

| | | |
|---|---|---|
| DE | 19517117 A1 | 11/1996 |
| DE | 10304284 A1 | 8/2004 |
| JP | 2001-157301 A | 6/2001 |
| JP | 2001-359203 A | 12/2001 |
| JP | 2003-021649 A | 1/2003 |
| JP | 2008-061432 | * 3/2008 |

OTHER PUBLICATIONS

German Office Action, dated Sep. 14, 2010 issued in counterpart application No. 10 2009 033 051.8.

* cited by examiner

*Primary Examiner* — Edward Tso
*Assistant Examiner* — Ahmed Omar
(74) *Attorney, Agent, or Firm* — Sughrue Mion, PLLC

(57) ABSTRACT

A battery charge monitoring device for monitoring feed of electric power from a power source installation to a battery, the power source installation being disposed separately from a vehicle on which the battery is mounted, and the vehicle using the electric power fed from the battery as a drive source for traveling, includes a vehicle storage portion which stores therein vehicle identification information allotted to the vehicle, a vehicle side communication portion which performs a power line communication with a power source side communication portion of the power source installation through a power line for feeding the electric power from the power source installation to the battery, and a vehicle side control portion which controls the vehicle side communication portion so as to transmit the vehicle identification information stored in the vehicle storage portion, to the power source side communication portion, when a communication channel is established between the power source side communication portion and the vehicle side communication portion.

8 Claims, 9 Drawing Sheets

BATTERY CHARGE MONITORING DEVICE

BACKGROUND

The present invention relates to a battery charge monitoring device for monitoring the operation of charging a battery which is mounted on a vehicle, for example, electric vehicle or hybrid vehicle.

In, for example, automobile industries in recent years, an electric vehicle which travels by utilizing only electricity as energy, and a hybrid vehicle on which both an engine and an electric motor are mounted, have been put into practical use from the viewpoints of the reduction of the emission of carbon dioxide and the efficient utilization of energy. In the general hybrid vehicle, when the vehicle decelerates, kinetic energy is converted into electric energy, which is recovered and with which a battery is charged, and when the vehicle travels, the consumption of fuel such as gasoline is suppressed by utilizing the recovered electric energy. However, merely by recovering the kinetic energy during the deceleration, the effect of suppressing the consumption of the fuel is low, and also the effect of reducing the carbon dioxide is low.

In this regard, a plug-in hybrid vehicle (plug-in HV) has been developed in order to heighten the effect of reducing the carbon dioxide. The plug-in hybrid vehicle has a function in which a plug disposed on an automobile side is inserted into a power source consent for domestic use, or the like, thereby to charge the battery of the automobile side from a domestic power source (commercial AC power source: AC 100V, or the like). Accordingly, electric energy obtained by the charge from the domestic power source can be utilized for the travel of the automobile, in addition to the kinetic energy recoverable during the deceleration. It therefore becomes possible to suppress the consumption of the fuel by raising the frequency in use of the electric motor and to heighten the effect of reducing the carbon dioxide by using the electric motor of high efficiency at a high frequency in use.

On the other hand, supposing a case where such plug-in hybrid vehicles have generally spread in the future, the act of robbery of electric power (the robbery of electricity) might be performed. More specifically, the plug-in hybrid vehicle can charge its battery by inserting the plug into a public power source installation, the power source consent of the house of the owner of the vehicle, the power source consent of another's house, or the like in any place where the consent of the power source exists. Therefore, it is also considered that the owner or the like of the plug-in hybrid vehicle might illegally perform the battery charge (the robbery of electricity) without leave, without being permitted by the rightful person of the power source installation or without paying a fee to the rightful person.

Techniques disclosed in, for example, Patent Document 1, Patent Document 2 and Patent Document 3 have been known as prior-art techniques for preventing the illegal charge, etc. which proceed in the outdoors or the like.

In Patent Document 1, there is disclosed the technique for feeding a portable equipment with electric power from a small-sized motor-driven vehicle on which a small-sized battery is mounted as in, for example, a motor-driven wheelchair.

Patent Document 2 discloses the technique for centrally managing processes for charging the batteries of individual electric vehicles which are parking in a multilevel parking area.

Patent Document 3 discloses the technique for preventing the act of tearing off the covering of a power feed cable and then connecting a load from outside so as to rob electricity. Concretely, it proposes to monitor a voltage fluctuation and to detect the occurrence of an abnormality such as the robbery of the electricity, in a case where an abnormal voltage drop has been observed for a long term.

[Patent Document 1] U.S. Pat. No. 6,762,572B1 (JP-A-2001-157301)
[Patent Document 2] JP-A-2001-359203
[Patent Document 3] JP-A-2003-21649

When the technique disclosed in Patent Document 3 is adopted by way of example, the existence or nonexistence of the electricity robbery can be detected by monitoring the abnormal drop of a power source voltage for the long term. However, assuming, for example, a case where the battery of the plug-in hybrid vehicle is charged from the power source consent, a charging time period for one charge is limited to only a comparatively short time period on the order of several hours. Therefore, unless the acts of the illegal battery charges are repeated many times for the long term, the existence or nonexistence of the illegal battery charge cannot be detected with the technique of Patent Document 3. That is, in a case where, while driving and moving the plug-in hybrid vehicle, a specified criminal has conducted the act of illegally charging the battery of the plug-in hybrid vehicle from those power source consents of various movement sites which differ from one another, the act of the electricity robbery cannot be sensed.

SUMMARY

The present invention has been made in view of the above circumstances, and has for its object to provide a battery charge monitoring device which serves to specify the act of electricity robbery as might be performed by the user of an electric vehicle or the like and to prevent the electricity robbery from occurring.

In order to accomplish the above object, the battery charge monitoring device according to the present invention is characterized by the following items (1)-(9):

(1) A battery charge monitoring device for monitoring feed of electric power from a power source installation to a battery, the power source installation being disposed separately from a vehicle on which the battery is mounted, and the vehicle using the electric power fed from the battery as a drive source for traveling, the battery charge monitoring device comprising:
 a vehicle storage portion which stores therein vehicle identification information allotted to the vehicle;
 a vehicle side communication portion which performs a power line communication with a power source side communication portion of the power source installation through a power line for feeding the electric power from the power source installation to the battery; and
 a vehicle side control portion which controls the vehicle side communication portion so as to transmit the vehicle identification information stored in the vehicle storage portion, to the power source side communication portion, when a communication channel is established between the power source side communication portion and the vehicle side communication portion.

(2) Preferably, the battery charge monitoring device further includes a vehicle-side battery charge history storing portion which stores therein power source identification information allotted to the power source installation,
 wherein the vehicle side control portion stores the power source identification information which is received from the power source side communication portion through the vehicle side communication portion, in the vehicle-side battery charge history storing portion, when the communication channel is established between the power source side communication portion and the vehicle side communication portion.

(3) Preferably, the battery charge monitoring device further includes a driver circuit which drives a charge switch to short-circuit or open a part of the power line in order to change-over ON/OFF of the feed of the electric power to the battery, wherein the vehicle side control portion outputs a control signal instructive of the opening of the charge switch, to the driver circuit, when the power source identification information is not received from the power source side communication portion by the vehicle side communication portion.

(4) Preferably, the vehicle-side battery charge history storing portion stores therein the power source identification information and the number of times of receiving the power source identification information transmitted cyclically from the power source side communication portion.

(5) Preferably, the battery charge monitoring device further includes a driver circuit which drives a charge switch to short-circuit or open a part of the power line in order to change-over ON/OFF of the feed of the electric power to the battery, wherein an authentication request signal which contains the vehicle identification information stored in the vehicle storage portion is transmitted to the power source side communication portion; and the vehicle side control portion outputs a control signal instructive of the short-circuiting or opening of the charge switch, to the driver circuit, in accordance with a response signal which notifies an authentication success or an authentication failure responsive to the authentication request signal and which is received from the power source side communication portion by the vehicle side communication portion.

(6) A battery charge monitoring device for monitoring feed of electric power from a power source installation to a battery, the power source installation being disposed separately from a vehicle on which the battery is mounted, and the vehicle using the electric power fed from the battery as a drive source for traveling, the battery charge monitoring device comprising:

a power-source-side battery charge history storing portion which stores therein vehicle identification information allotted to the vehicle;

a power source side communication portion which performs a power line communication with a vehicle side communication portion of the vehicle through a power line for feeding the electric power from the power source installation to the battery; and a power source side control portion which stores the vehicle identification information received from the vehicle by the power source side communication portion, in the power-source-side battery charge history storing portion, when a communication channel is established between the vehicle side communication portion and the power source side communication portion.

(7) Preferably, the battery charge monitoring device further includes a power source storage portion which stores therein power source identification information allotted to the power source installation, wherein the power source side control portion controls the power line communication so as to transmit the power source identification information stored in the power source storage portion, to the vehicle-side power line communication portion, when the communication channel is established between the vehicle side communication portion and the power source side communication portion.

(8) Preferably, the power-source-side battery charge history storing portion stores therein the vehicle identification information and the number of times of receiving the vehicle identification information transmitted cyclically from the vehicle side communication portion.

(9) Preferably, the battery charge monitoring device further includes a vehicle identification information database which stores therein registered vehicle identification information for identifying the vehicle which is permitted to feed the electric power from the power source installation;

wherein when an authentication request signal containing the vehicle identification information is received from the vehicle when the communication channel is established between the vehicle side communication portion and the power source side communication portion, the power source side control portion discriminates whether or not the registered vehicle identification information stored in the vehicle identification information database is matched with the vehicle identification information contained in the authentication request signal, and controls the power source side communication portion so as to transmit a response signal for notifying an authentication success or an authentication failure based on a result of the discrimination, to the vehicle side communication portion.

According to the battery charge monitoring device of the configuration of the above item (1), the vehicle side control portion transmits the vehicle identification information to the other station (the power source installation). Therefore, it becomes possible that the side of the power feed specify the opposite party (vehicle) of the power feed, and this serves to detect the robbery of electricity, etc.

Besides, according to the battery charge monitoring device of the configuration of the above item (2), the history of the battery charge operation is stored in the vehicle-side battery charge history storing portion, and information capable of specifying the power source installation is contained in the history. Therefore, a power feed source (such as a power source consent in a general home) can be specified also on the vehicle side, and this serves to detect the electricity robbery, etc.

Besides, according to the battery charge monitoring device of the configuration of the above item (3), in a situation, for example, where the electricity robbery might be performed at a high possibility because any special monitoring device (for example, the battery charge monitoring device of the present invention) does not exist on the side of the power source (such as the power source consent in the general home), the battery charge operation is automatically inhibited, whereby the electricity robbery can be prevented from occurring.

Besides, according to the battery charge monitoring device of the configuration of the above item (4), that number of times of receiving power source identification information is counted in a case where the power source identification information is cyclically transmitted from the power source side, whereby how much electric power has been fed to the battery mounted on the vehicle can be specified. When this is utilized, the quantity of electric power fed from a certain power source installation to the vehicle can be specified by a simple configuration.

Besides, according to the battery charge monitoring device of the configuration of the above item (5), vehicle identification information is transmitted from the vehicle side control portion to the power feed source (such as the power source consent in the home or a public power feed installation). In the power feed source, therefore, the identification information is authenticated, and an operation based on the result of the authentication, that is, the permission or inhibition of the feed of electric power is determined. On the vehicle side, therefore, the charge switch is interrupted to inhibit the battery charge operation, in case of the electricity robbery or the like, so that the electricity robbery can be prevented from occurring. Further, the power feed source can grasp the vehicle identification information of the vehicle having tried to rob the electricity, so as to leave a history, and hence, this serves to detect the electricity robbery.

Besides, according to the battery charge monitoring device of the configuration of the above item (6), the vehicle identification information received from the vehicle side is recorded, whereby the opposite party (vehicle) of the power feed can be specified on the power feed side, and this serves to detect the electricity robbery, etc.

Besides, according to the battery charge monitoring device of the configuration of the above item (7), the history of the battery charge operation is stored in the vehicle-side battery charge history storing portion, and information capable of specifying the power source installation is contained in the history. Therefore, the power feed source (such as the power source consent in the general home) can be specified also on the vehicle side, and this serves to detect the electricity robbery, etc.

Besides, according to the battery charge monitoring device of the configuration of the above item (8), that number of times of receiving vehicle identification information is counted in a case where the vehicle identification information is cyclically transmitted from the vehicle side, whereby how much electric power has been fed to the battery mounted on the vehicle can be specified. When this is utilized, the quantity of electric power fed from a certain power source installation to the vehicle can be specified by a simple configuration.

Besides, according to the battery charge monitoring device of the configuration of the above item (9), vehicle identification information received from the vehicle is authenticated in the power feed source, and an operation based on the result of the authentication, that is, the permission or inhibition of the feed of electric power is determined. On the vehicle side, therefore, the charge switch is interrupted to inhibit the battery charge operation, in case of the electricity robbery or the like, so that the electricity robbery can be prevented from occurring.

According to the battery charge monitoring device of the present invention, it becomes possible to specify the act of the electricity robbery as might be performed by the user of the electric vehicle or the like and to prevent the electricity robbery from occurring.

DETAILED DESCRIPTION OF EXEMPLARY EMBODIMENTS

Practicable embodiments concerning the battery charge monitoring device and battery charge monitoring method of the present invention will be described below with reference to FIG. 1-FIG. 8.

Figure 1:
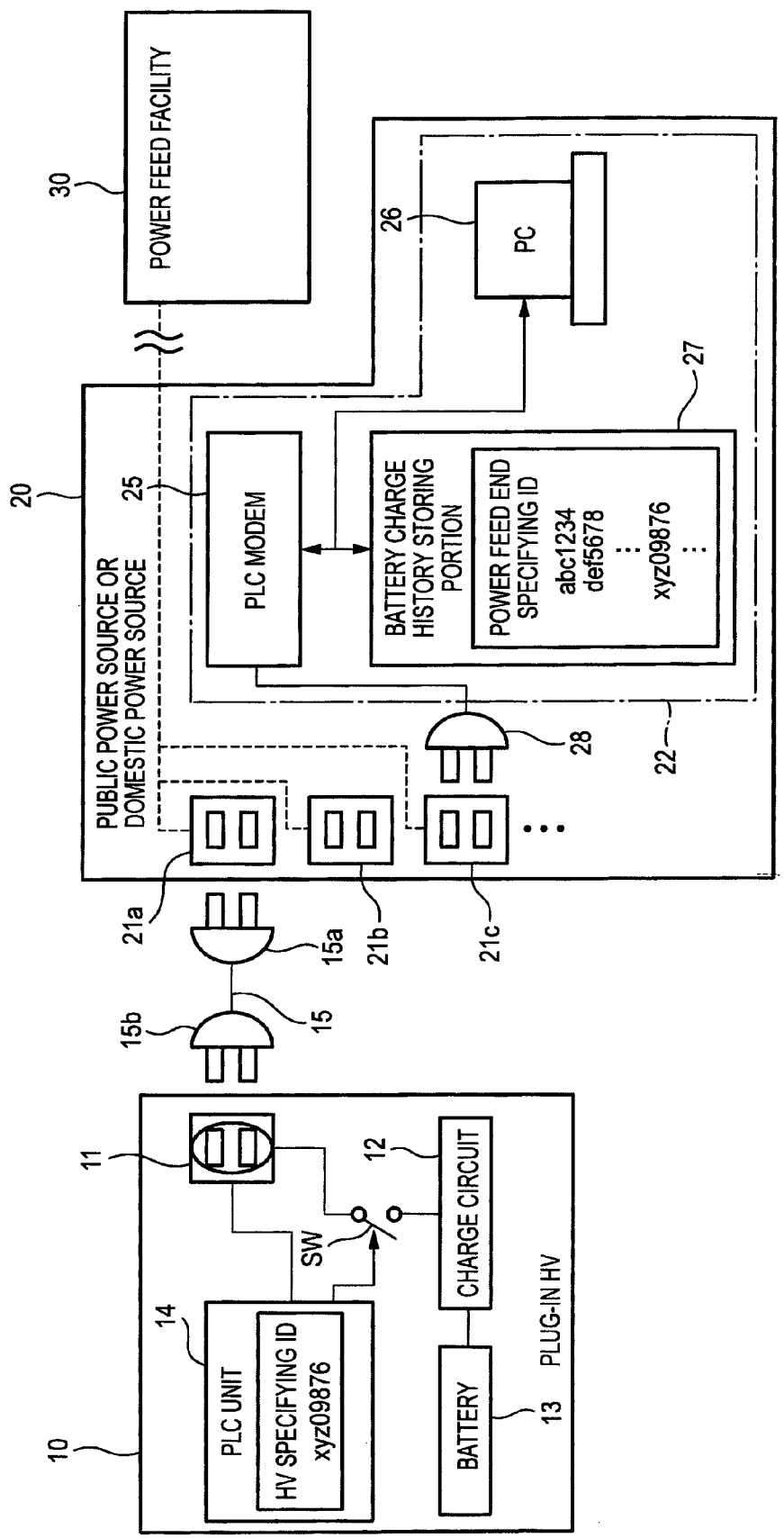
FIG. 1 is a block diagram showing configurational examples of a plug-in hybrid vehicle and a power source installation which is utilized for battery charge, in an embodiment.
Figure 2:
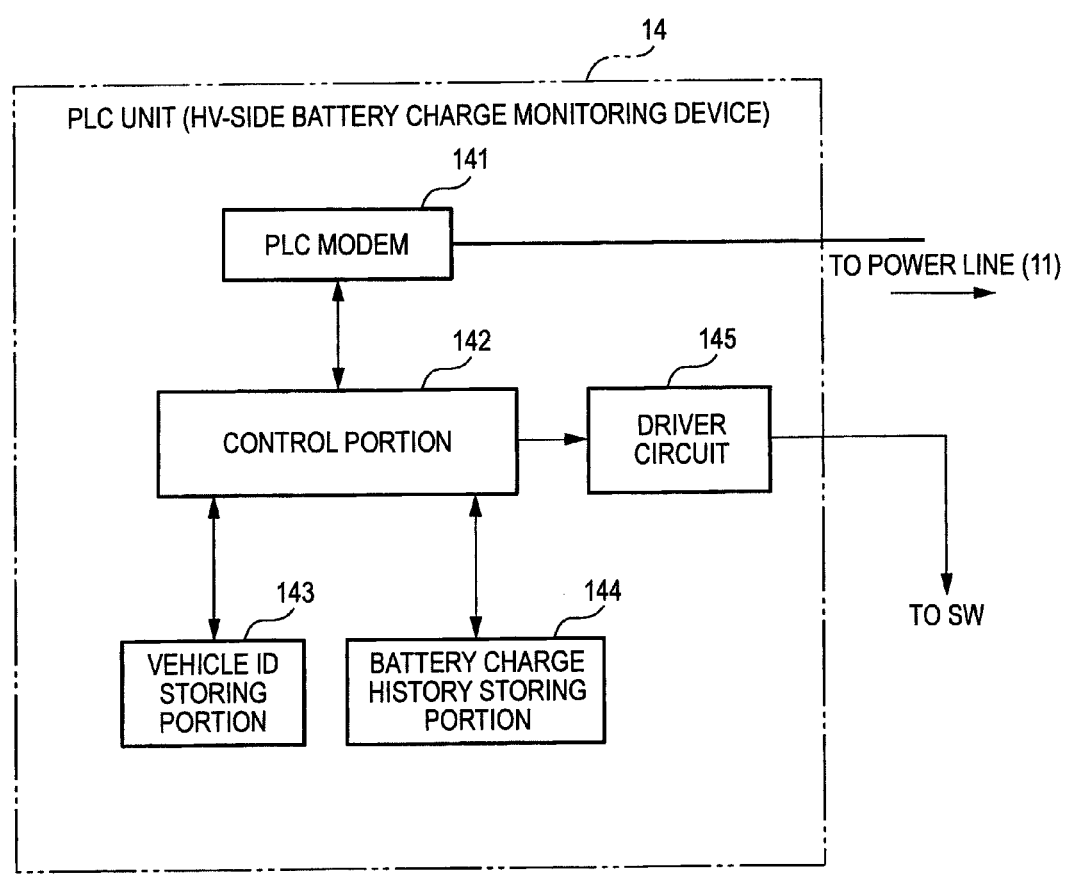
FIG. 2 is a block diagram showing the configuration of a PLC unit shown in FIG. 1.
Figure 3:
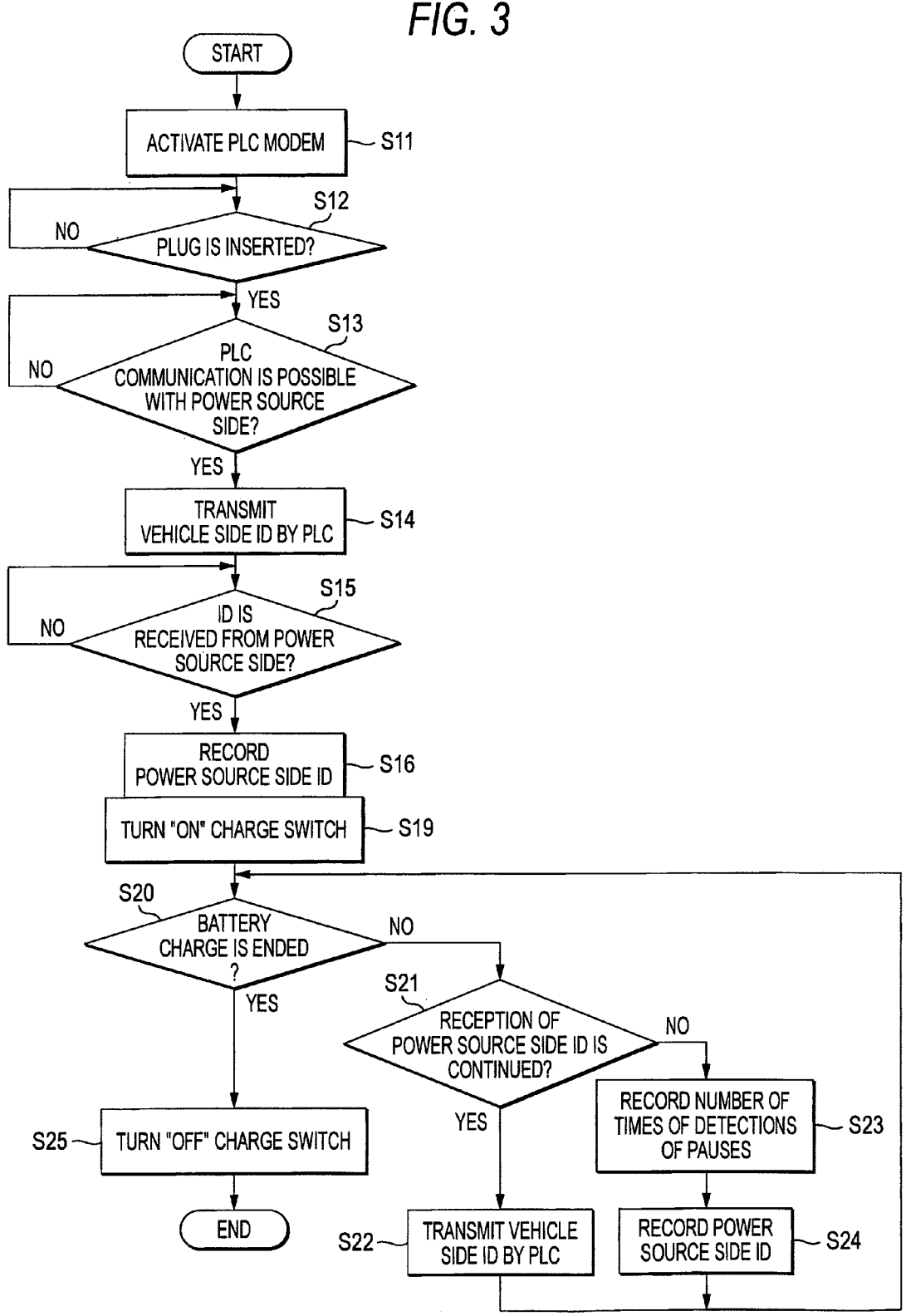
FIG. 3 is a flow chart showing the contents of the control of the PLC unit which is disposed on a plug-in hybrid vehicle side shown in FIG. 1.
Figure 4:
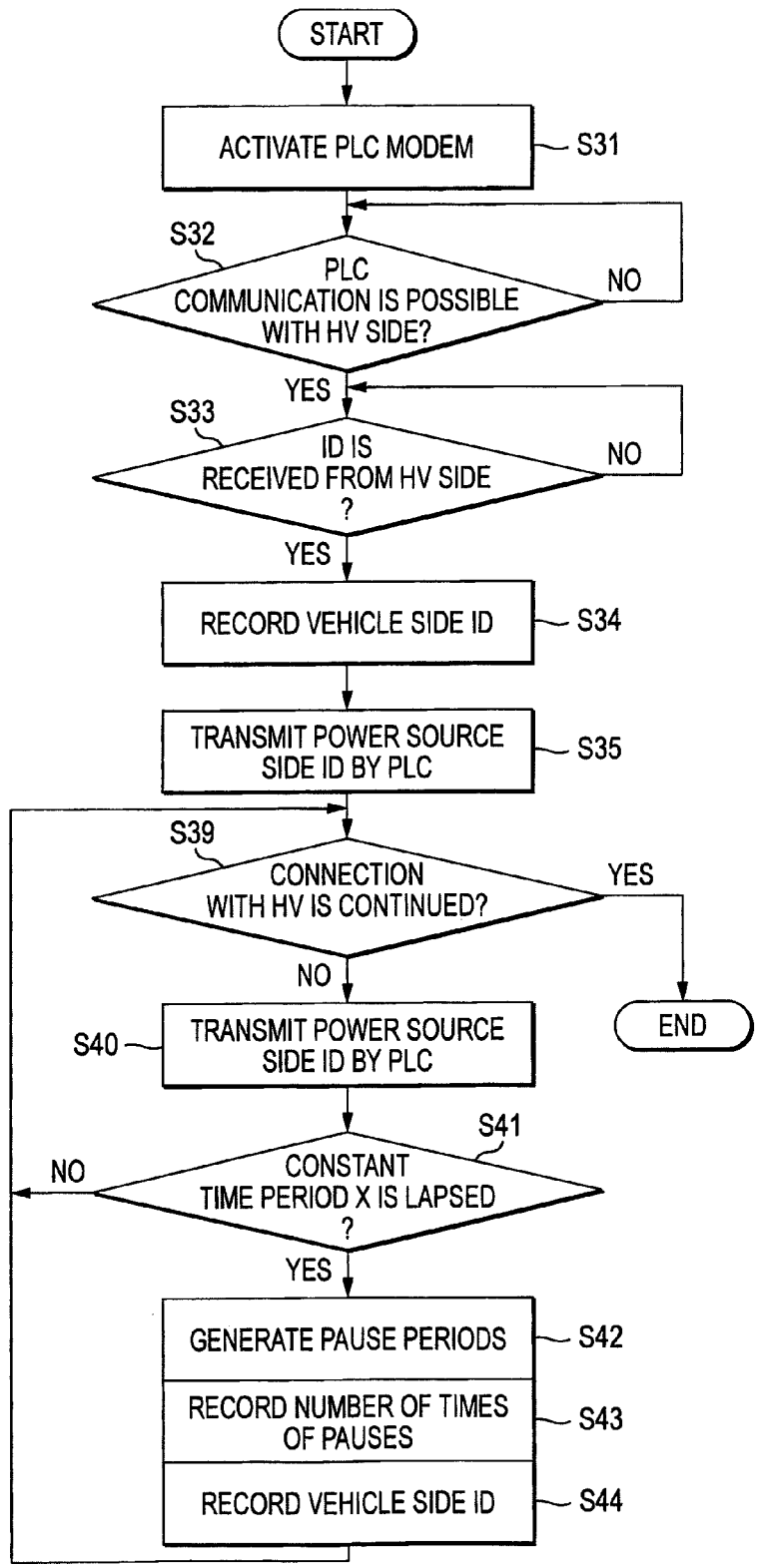
FIG. 4 is a flow chart showing the contents of the control of a power-source-side battery charge monitoring device which is disposed on a power source installation side shown in FIG. 1.
Figure 5:
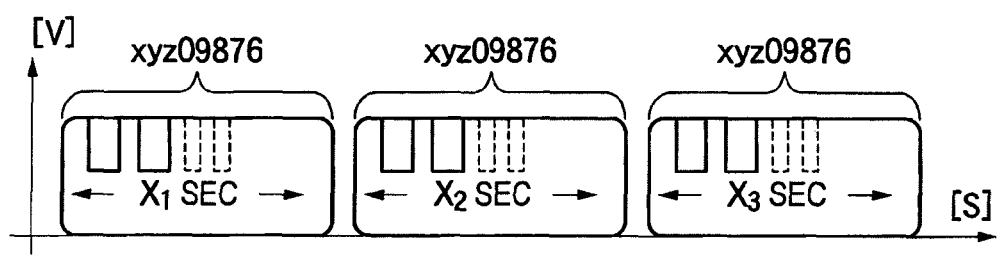
FIG. 5 is a time chart showing configurational examples of signals which are transferred via a charging electric cable.
Figure 6:
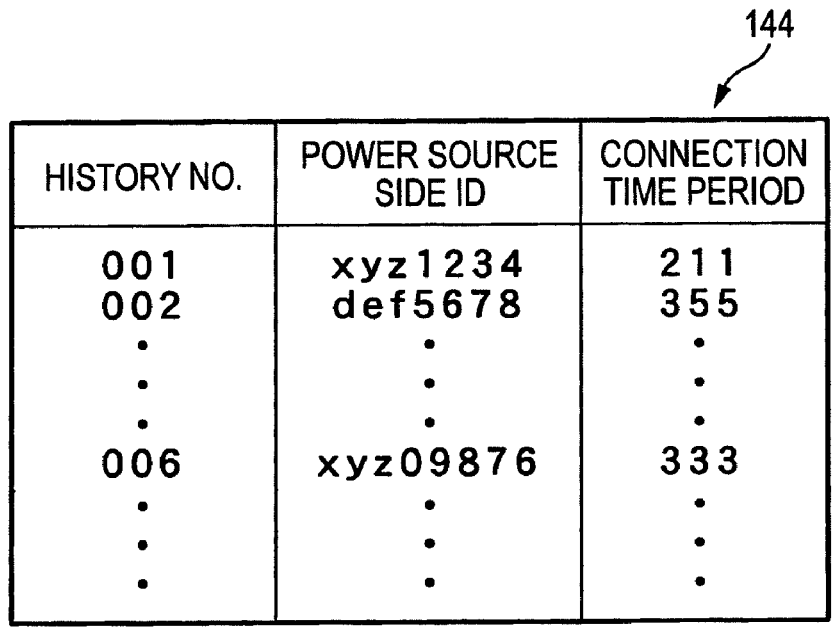
FIG. 6 is a model diagram showing a configurational example of information which is retained in a battery charge history storing portion on the PLC unit of the plug-in hybrid vehicle side.
Figure 7:
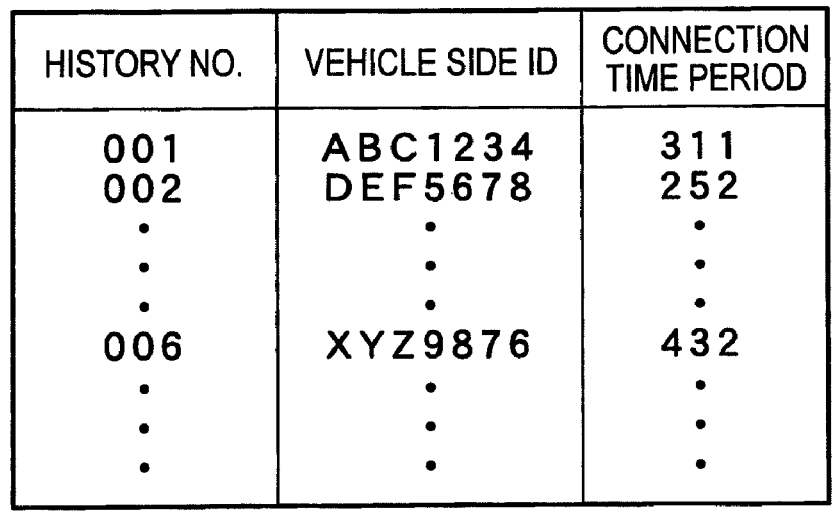
FIG. 7 is a model diagram showing a configurational example of information which is retained in a battery charge history storing portion 27 of the power source installation side.
Figure 8:
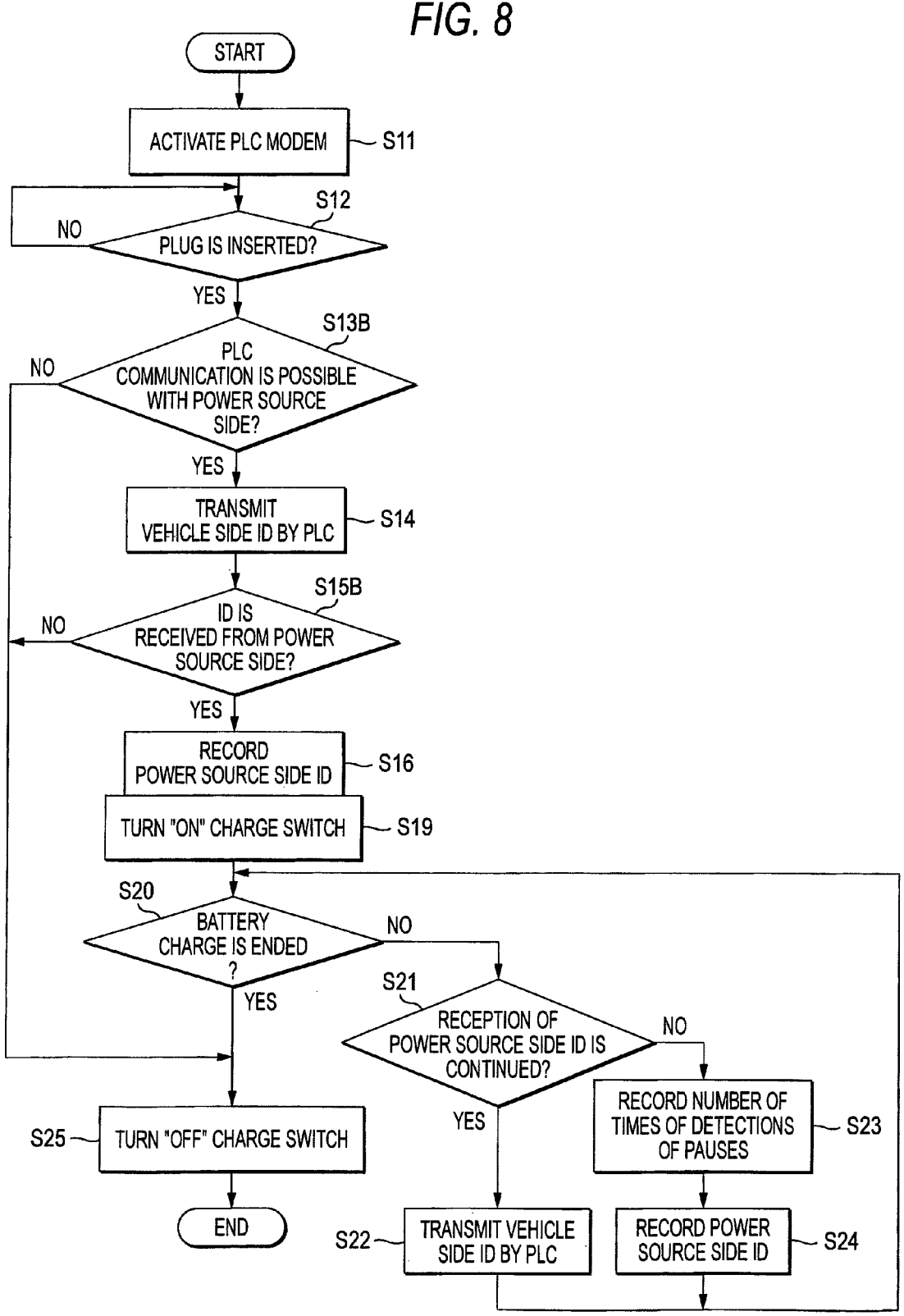
FIG. 8 is a flow chart showing a modification to the operation shown in FIG. 3.

FIG. 1 is a block diagram showing configurational examples of a plug-in hybrid vehicle and a power source installation which is utilized for battery charge, in a first embodiment. FIG. 2 is a block diagram showing the configuration of a PLC unit shown in FIG. 1. FIG. 3 is a flow chart showing the contents of the control of the PLC unit which is disposed on a plug-in hybrid vehicle side shown in FIG. 1. FIG. 4 is a flow chart showing the contents of the control of a power-source-side battery charge monitoring device which is disposed on a power source installation side shown in FIG. 1. FIG. 5 is a time chart showing configurational examples of signals which are transferred via a charging electric cable. FIG. 6 is a model diagram showing a configurational example of information which is retained in a battery charge history storing portion on the PLC unit of the plug-in hybrid vehicle side. FIG. 7 is a model diagram showing configurational examples of information which is retained in a battery charge history storing portion 27 of the power source installation side. FIG. 8 is a flow chart showing a modification to the operation shown in FIG. 3.

In the first embodiment, as shown in FIG. 1, there is supposed a case where a plug-in hybrid vehicle (HV) 10 is connected with a power source installation 20 through a charging electric cable 15, so as to charge a battery 13 by utilizing electric power which is fed from the power source installation 20 to the plug-in hybrid vehicle 10.

The plug-in hybrid vehicle 10 is furnished with the function of charging the battery 13 by utilizing commercial AC power (for example, AC 100V) which can be derived from a power source consent for general domestic use. Therefore, the power source installation 20 may well be an installation disposed in a public place or an installation for the general domestic use, as long as it is an installation capable of feeding the required commercial AC power. The power source installation 20 is fed with electric power from a predetermined power feed facility 30. In general, the power feed facility 30 is an installation on an electric power company, and it corresponds to a substation, a pole mounted transformer, or the like.

In case of the power source installation within a general home, any special installation, for example, an accounting device is not provided for feeding the electric power to the plug-in hybrid vehicle 10. Therefore, when the power source plug 15a of the charging electric cable 15 is connected to a power source consent 21a as in the power source installation 20 shown in FIG. 1, the plug-in hybrid vehicle 10 can be fed with the electric power from the power source installation 20 at any time. Accordingly, the owner of the plug-in hybrid vehicle 10, or the like is capable of performing a battery charging operation without being permitted by the owner of the power source installation 20 or without paying an electricity fee, and there is the possibility that the illegal act of the battery charge (electricity robbery) will be performed by the owner of the plug-in hybrid vehicle 10, or the like.

Therefore, a power-source-side battery charge monitoring device 22 is disposed as a measure against the electricity robbery and the like illegal acts on the side of the power source installation 20. The power-source-side battery charge monitoring device 22 includes a PLC (Power Line Communications) modem 25, a personal computer 26 and a battery charge history storing portion 27. A power source plug 28 provided on a the power source cord of the PLC modem is connected with one power source consent 21c (21a or 21b).

A program for incarnating the functions of the power-source-side battery charge monitoring device 22 is built in the personal computer 26. Therefore, the personal computer 26 runs the program, whereby a monitoring control as shown in FIG. 4 can be performed. Besides, peculiar identification information (power source side ID) for specifying the power source installation 20 is registered on the personal computer 26 beforehand. Under the control of the personal computer 26, history information on the battery charging operation of the plug-in hybrid vehicle 10 is generated and is accumulated into the battery charge history storing portion 27. Concrete examples of the history information which is accumulated into the battery charge history storing portion 27 are shown in FIG. 7.

Incidentally, a microcomputer of single chip in which the program is built beforehand may well be utilized instead of the personal computer 26, or the function thereof may well be built into the PLC modem 25.

A charge circuit 12 for charging the battery 13, and a PLC unit (vehicle-side battery charge monitoring device) 14 are provided on the plug-in hybrid vehicle 10. The PLC unit 14 is connected with the power line of a vehicle side consent 11. As will be stated later, functions for coping with the electricity robbery and the like illegal battery charge operations are installed on the PLC unit 14.

The power line of the input side of the charge circuit 12 is connected with the vehicle side consent 11 through a charge switch SW. Accordingly, when the power source consent 21a of the power source installation 20 and the vehicle side consent 11 are electrically connected through the battery charging electric cable 15, the commercial AC power which is fed from the power source installation 20 is applied to the charge circuit 12 via the charge switch SW. The charge circuit 12 generates predetermined DC power which is necessary for the battery charge, from the inputted commercial AC power, and it charges the battery 13 by feeding the DC power thereto. The charge switch SW is a switch capable of electrically controlling a connection state, for example, a relay.

The PLC unit 14 which is mounted on the plug-in hybrid vehicle 10, includes a PLC modem 141, a control portion 142, a vehicle ID storing portion 143, a battery charge history storing portion 144 and a driver circuit 145 as shown in FIG. 2.

Likewise to a general PLC modem commercially available, the PLC modem 141 is capable of transferring information between the PLC modem 141 and another station (another PLC modem) connected to an identical electric power line, through this electric power line. Since a carrier of high frequency is used for the transfer of the information, the information can be transferred without exerting influence on the feed of the electric power.

The vehicle ID storing portion 143 is a nonvolatile memory, and it retains the information of peculiar identification information (vehicle side ID) which is determined for each individual vehicle beforehand. The ID stored in the vehicle ID storing portion 143 cannot be rewritten.

The battery charge history storing portion 144 is a nonvolatile memory. The contents of battery charge history information stored in the battery charge history storing portion 144 are successively added or updated by history information which is generated by the control of the control portion 142 when the battery charge operation is performed.

The control portion 142 is a microcomputer for controlling the operation of the PLC unit 14. The control portion 142 performs a control as shown in FIG. 3, by employing the PLC modem 141, vehicle ID storing portion 143, battery charge history storing portion 144 and driver circuit 145 which are connected to the control portion 142. Owing to this control, the history information on the battery charge operation is generated, and this history information is accumulated into the battery charge history storing portion 144. Concrete examples of the history information which is accumulated into the battery charge history storing portion 144, are shown in FIG. 6.

The outline of the operation of the PLC unit 14 mounted on the plug-in hybrid vehicle 10, is as shown in FIG. 3. The operation of the PLC unit 14 will be described below with reference to FIG. 3.

At a step S11, the control portion 142 activates the PLC modem 141.

At a step S12, the control portion 142 checks whether the plug-in hybrid vehicle 10 is connected with the power source installation 20 through the battery charging electric cable 15. That is, the control portion 142 checks whether a chargeable state is established by connecting the power source plug 15a of the battery charging electric cable 15 with the power source consent 21a, and the power source plug 15b thereof is connected with the vehicle side consent 11. In actuality, an insertion of the power source plug 15b may be detected by a switch, a sensor or the like in the vicinity of the vehicle side consent 11. Also, it may be checked that a predetermined power source voltage is appeared across the electrodes of the vehicle side consent 11. Further, it may be checked that the existence or nonexistence of the carrier which is sent from the PLC modem on the power source installation 20.

At a step S13, the control portion 142 checks whether or not the PLC modem 141 is in a state where it is communicable with the PLC modem of the power source installation 20. In a case where, as shown in FIG. 1, the power-source-side battery charge monitoring device 22 is connected to the power source consent 21c of the power source installation 20, the PLC modem 25 within the power-source-side battery charge monitoring device 22 operates as will be stated later, and hence, the PLC modem 141 on the plug-in hybrid vehicle 10 falls into the state where it is communicable with the power source installation 20 (the state where a communication channel is established). When the PLC modem 141 is fallen into the communicable state, the control flow proceeds to the next step S14.

At the step S14, the control portion 142 reads identification information retained in the vehicle ID storing portion 143 and transmits the read ID as the vehicle side ID by PLC communications. More specifically, the vehicle side ID is sent from the PLC modem 141 to the PLC modem 25 through the electric line path of the power line—vehicle side consent 11—battery charging electric cable 15—power source consent 21a.

After the PLC unit 14 on the plug-in hybrid vehicle 10 transmits the vehicle side ID, the power source side ID is transmitted from the power-source-side battery charge monitoring device 22 connected to the power source installation 20, by the PLC communications as will be stated later. At the next step S15, therefore, the control portion 142 waits until the PLC unit 14 transmits the power source side ID. When the control portion 142 receives the power source side ID, the control flow proceeds to the next step S16.

At the step S16, the control portion 142 records the power source side ID received at the step S15, on the battery charge history storing portion 144.

At a step S19, the control portion 142 controls the charge switch SW through the driver circuit 145 so as to change-over this charge switch into an ON state where the battery charge is possible. That is, the charge switch SW is driven so as to short-circuit the power line, thereby to give the charge circuit 12 the electric power which is fed from the power source installation 20 to the vehicle side consent 11 via the battery charging electric cable 15. Accordingly, the charge circuit 12 starts the charge of the battery 13 at this time point.

At a step S20, the control portion 142 checks whether or not the battery charge is ended. The end of the battery charge can be deemed in, for example, a case where a user manipulates an end button (not shown), a case where sufficient electric power is accumulated into the battery 13 and where a current which flows from the charge circuit 12 to the battery 13 becomes a predetermined value or less, a case where the battery charging electric cable 15 is taken out, or a case where the carrier which is sent from the PLC modem of the opposite side becomes undetected. During the battery charge, the processing of steps S20-S24 is repeatedly executed.

Besides, during the battery charge, that is, while the electric power is fed from the power source installation 20 to the plug-in hybrid vehicle 10 by connecting the plug-in hybrid vehicle 10 with the power source installation 20, the power source side ID is repeatedly transmitted from the power-source-side battery charge monitoring device 22 as will be stated later. On the electric power line, for example, the battery charging electric cable 15, as in a signal shown in FIG. 5, the information of the power source side ID sent by the power-source-side battery charge monitoring device 22 as the PLC signal appears repeatedly over a predetermined time period ($X_1$ second), the information of the power source ID thereafter appears repeatedly over a predetermined time period ($X_2$ second) again after a pause of predetermined time period, and the information of the power source ID appears repeatedly over a predetermined time period ($X_3$ second) again after a further pause of predetermined time period. Incidentally, $X_1$, $X_2$ and $X_3$ denote the same time lengths.

At the step S21, the control portion 142 checks whether the PLC modem 141 is continuing the reception of the power source side ID sent by the power-source-side battery charge monitoring device 22, or the control portion 142 detects the interruption of the reception corresponding to the pause. In a case where the reception is continuing, the control flow proceeds to the next step S22, and in a case where the pause is detected, the control flow proceeds to the step S23.

At the step S22, the control portion 142 transmits the identification information read from the vehicle ID storing portion 143, as the vehicle side ID again from the PLC modem 141. That is, during the battery charge, the vehicle side ID is repeatedly transmitted from the plug-in hybrid vehicle 10 to the power source installation 20, and the power source ID is repeatedly transmitted from the power source installation 20 to the plug-in hybrid vehicle 10.

At the step S23, the control portion 142 counts that number of times of receptions of the power source side ID, and the control portion 142 records the counted number of times of the receptions in the battery charge history storing portion 144. Concretely, the control portion 142 counts the number of times of detections of the pauses which express the temporary interruptions of the receptions of the power source side ID, and the control portion 142 records the counted number of times of the pauses in the battery charge history storing portion 144. In the case, for example, where the PLC modem 141 receives the signals as shown in FIG. 5, the pause between the term $X_1$ and the term $X_2$ is detected as the first pause, the pause between the term $X_2$ and the term $X_3$ is detected as the second pause, and the third pause is detected after the end of the term $X_3$. Each time the pause is detected, that number of times of detections of the pauses which is recorded in the battery charge history storing portion 144 is updated as the history.

At the step S24, the control portion 142 records the power source side ID which is detected by the PLC modem 141 last, in the battery charge history storing portion 144 as the history. Besides, the control portion 142 compares the power source side ID detected last and the power source side ID recorded in the battery charge history storing portion 144, so as to check if both the IDs are matched. In a case where both the IDs are matched, the record need not be updated, but in a case where both the IDs are not matched, the power source side ID detected last is additionally recorded in the battery charge history storing portion 144 as the new history.

At a step S25, the control portion 142 controls the charge switch SW through the driver circuit 145 and disconnects the input of the charge circuit 12 from the power line of the vehicle side consent 11 or the like, thereby to end the battery charge operation.

The PLC unit 14 executes the processing shown in FIG. 3, whereby history information as shown in FIG. 6 by way of example is recorded and saved on the battery charge history storing portion 144. In the example shown in FIG. 6, the information items of "history No.", "power source side ID" and "connection time period" are contained as historical information items which indicate each battery charge manipulation. The "history No." is the No. which indicates the turn of the battery charge manipulation. The "power source side ID" is identification information received by the PLC modem 141 from the power source installation 20. The "connection time period" is that number of times of detections of pauses which is recorded at the step S23. More specifically, since the pause appears every fixed time period, the number of times of detections of the pauses corresponds to the length of the connection time period or the time period for which the battery charge operation is performed. The "connection time period" is recorded every "power source side ID" in this manner, whereby how much electric power is fed from each "power source side ID" to the vehicle bearing these information items can be specified.

A modification to the operation shown in FIG. 3 is shown in FIG. 8. In the operation shown in FIG. 8, steps S13B and S15B differ from the steps of FIG. 3. More specifically, in the operation shown in FIG. 8, in a case where the PLC communications are impossible with the power source installation 20, at the step S13B, or in a case where the power source side ID from the power source installation 20 cannot be detected within a predetermined time period, at the step S15B, the control flow proceeds to the step S25, and hence, the battery charge operation is not performed. Accordingly, in a case, for example, where the power-source-side battery charge monitoring device 22 is not connected to the power source installation 20, the battery charge operation can be inhibited, and the robbery of electricity can be prevented. In a case where the power-source-side battery charge monitoring device 22 is connected, a history remains in the battery charge history storing portion 144 on the PLC unit 14, and hence, the history can be utilized for the detection of the act of the electricity robbery.

Incidentally, the charge switch SW for changing-over the ON/OFF of the battery charge operation of the charge circuit 12 can also be omitted.

The outline of the operation of the personal computer 26 within the power-source-side battery charge monitoring device 22 connected to the power source installation 20 is shown in FIG. 4. The operation shown in FIG. 4 will be described below.

At a step S31, the personal computer 26 activates the PLC modem 25.

At a step S32, the personal computer 26 checks whether the PLC modem 25 is capable of communicating between the PLC modem 25 and the PLC modem 141 on the plug-in hybrid vehicle 10. When the PLC unit 14 on the plug-in hybrid vehicle 10 is operating with this plug-in hybrid vehicle 10 connected to the power source installation 20 through the battery charging electric cable 15, the PLC modem 25 falls into a state where it is communicable with the PLC modem 141 within the PLC unit 14. In that case, therefore, the control flow proceeds to the next step S33.

At the step S33, the personal computer 26 checks whether the PLC modem 25 receives the vehicle side ID which is sent from the plug-in hybrid vehicle 10. When PCL modem 25 receives the vehicle side ID, the control flow proceeds to the next step S34.

At the step S34, the personal computer 26 records the vehicle side ID received at the step S33, on the battery charge history storing portion 27.

At a step S35, the personal computer 26 loads the power source side ID which is registered therein beforehand. The personal computer 26 transmits the power source side ID by PLC communications through the PLC modem 25, thereby to send the ID to the plug-in hybrid vehicle 10. Thus, the power source side ID can be recognized by the PLC unit 14 on the plug-in hybrid vehicle 10.

At a step S39, the personal computer 26 discriminates whether or not the connection state between the power source installation 20 and the plug-in hybrid vehicle 10 is continuing. Concretely, it is detected that the power source plug 15a of the battery charging electric cable 15 is connected to the power source consent 21a by a switch or the like (not shown) located near the power source consent 21a, or the existence or nonexistence of the carrier sent onto the battery charging electric cable 15 is checked by the PLC modem 141 of the plug-in hybrid vehicle 10.

At a step S40, the personal computer 26 transmits the power source side ID by the PLC communications through the PLC modem 25 again, thereby to send this ID to the plug-in hybrid vehicle 10. Since the step S40 is repeatedly executed, the power source side ID is repeatedly transmitted from the PLC modem 25 in short cycles while the plug-in hybrid vehicle 10 is connected with the power source installation 20. Besides, as stated before, also the PLC modem 141 on the plug-in hybrid vehicle 10 repeatedly transmits the vehicle side ID. Therefore, the personal computer 26 successively accepts and checks the vehicle side ID received by the PLC modem 25.

At a step S41, the personal computer 26 checks whether a predetermined constant time period (X second) has lapsed. If the constant time period has not lapsed, the control flow proceeds to the step S39, and when the constant time period has lapsed, the control flow proceeds to a step S42. That is, the processing of the step S42, et seq. is executed every constant time period (X second).

At the step S42, the personal computer 26 generates a pause period for temporarily interrupting the transmission of the power source side ID. Concretely, a wait for a prescribed time period is made, whereby the execution of the step S40 is stopped meantime, and the transmission of the power source side ID is suspended.

Accordingly, the signal sent by the PLC modem 25 through the PLC communications to the battery charging electric cable 15 falls into the state as shown in FIG. 5 by way of example. That is, the information of the power source side ID sent by the PLC modem 25 as the PLC signal appears repeatedly over the predetermined time period ($X_1$ second), the information of the power source ID thereafter appears repeatedly over the predetermined time period ($X_2$ second) again after the pause of the predetermined time period, and the information of the power source ID appears repeatedly over the predetermined time period ($X_3$ second) again after the further pause of the predetermined time period. Incidentally, $X_1$, $X_2$ and $X_3$ denote the same lengths (X second).

Besides, as stated before, when the power source installation 20 is transmitting the information of the power source side ID, also the PLC unit 14 on the plug-in hybrid vehicle 10 repeats the transmissions of the vehicle side ID. Therefore, also the signal sent by the PLC unit 14 becomes the same as in FIG. 5. That is, the information of the vehicle side ID sent by the PLC modem 141 as the PLC signal appears repeatedly over the predetermined time period ($X_1$ second), the information of the vehicle side ID thereafter appears repeatedly over the predetermined time period ($X_2$ second) again after the pause of the predetermined time period, and the information of the vehicle side ID appears repeatedly over the predetermined time period ($X_3$ second) again after the further pause of the predetermined time period.

At a step S43, the personal computer 26 counts that number of times of receptions of the vehicle side ID, and the personal computer 26 records the counted number of times of receptions in the battery charge history storing portion 27. Concretely, the personal computer 26 counts the number of times of the pauses at the step S42, and the personal computer 26 records the counted number of times of pauses in the battery charge history storing portion 27 as the history. Besides, in a case where the vehicle side ID received last is different from the vehicle side ID received before, the number of times of pauses is cleared, and the counting is started again from zero.

At a step S44, the personal computer 26 records the vehicle side ID received by the PLC modem 25 last, in the battery charge history storing portion 27 as the history. Besides, the personal computer 26 compares the vehicle side ID detected last and the vehicle side ID recorded in the battery charge history storing portion 27, thereby to check if both the IDs are matched. In a case where both the IDs are matched, the record need not be updated, but in a case where both the IDs are not matched, the vehicle side ID detected last is additionally recorded in the battery charge history storing portion 27 as a new history.

The power-source-side battery charge monitoring device 22 executes the processing shown in FIG. 4, whereby history information as shown in FIG. 7 by way of example is recorded and saved on the battery charge history storing portion 27. In the example shown in FIG. 7, the information items of "history No.", "vehicle side ID" and "connection time period" are contained as historical information items which indicate each battery charge manipulation (power feed operation). The "history No." is the No. which indicates the turn of the battery charge manipulation. The "vehicle side ID" is identification information received by the PLC modem 25 from the plug-in hybrid vehicle 10. The "connection time period" is that number of times of detections of pauses which is recorded at the step S43. More specifically, since the pause appears every fixed time period (X second), the number of times of detections of the pauses corresponds to the length of the connection time period or the time period for which the battery charge operation is performed. The "connection time period" is recorded every "vehicle side ID" in this manner, whereby how much electric power is fed to each vehicle side can be specified.

By the way, the transmission timing of the vehicle side ID transmitted by the PLC unit 14 of the plug-in hybrid vehicle 10 as the PLC signal, the transmission timing of the power source side ID transmitted by the power-source-side battery charge monitoring device 22 of the power source installation 20 as the PLC signal, and so forth can be altered as may be needed. However, the transmissions of the vehicle side ID and the power source side ID should desirably be repeated regularly in comparatively short cycles in order to make it possible to check if the connection state or the battery charge state is kept.

In the case as shown in FIG. 1 where the power-source-side battery charge monitoring device 22 is connected to the power source installation 20 and where the PLC unit 14 furnished with the monitoring function is installed on the side of the plug-in hybrid vehicle 10, the history information as shown in FIG. 6 is accumulated in the battery charge history storing portion 144 on the plug-in hybrid vehicle 10, and the history information as shown in FIG. 7 is accumulated in the battery charge history storing portion 27 on the side of the power source installation 20, when the plug-in hybrid vehicle 10 is fed with a current from the power source installation 20 through the battery charging electric cable 15 so as to charge the battery 13. In a case where the electricity robbery or the like illegal act exists, it can be detected by examining the contents of the history information.

In a case, for example, where the history information as shown in FIG. 6 is retained in the battery charge history storing portion 144, the actual relation that the plug-in hybrid vehicle 10 performed the battery charge operation between the plug-in hybrid vehicle 10 and the power source installation 20 to which the power source side ID of "xyz1234" is allotted, for a time period corresponding to the value of "211", can be confirmed from the contents of the first history.

Besides, in a case, for example, where the history information as shown in FIG. 7 is retained in the battery charge history storing portion 27, the actual relation that the power source installation 20 has performed the power feed for the battery charge for the vehicle to which the vehicle side ID of "ABC1234" is allotted, for a time period corresponding to the value of "311", can be confirmed from the contents of the first history.

Accordingly, in such a case where the owner or the like of the plug-in hybrid vehicle 10 made the connection for the battery charge without being permitted by the rightful person or the like of the power source installation 20 or without paying the fee to him/her, the rightful person or the like of the power source installation 20 can confirm the illegal act on the basis of the history information, and he/she can demand the payment of the fee from the owner or the like of the plug-in hybrid vehicle 10 or take an action for preventing the reoccurrence of the act of the electricity robbery.

Incidentally, the information of the date and hour may well be added to the length of the connection time period, among the history information items of each of the battery charge history storing portion 144 and the battery charge history storing portion 27. The date and hour at which the act of the electricity robbery is performed can be checked by containing the information of the date and hour, and the information of the date and hour serves to check if the history of the battery charge history storing portion 144 and the history of the battery charge history storing portion 27 are matched.

Next, there will be described a battery charge monitoring device and a battery charge monitoring method in the second embodiment of the present invention. The configurations of a plug-in hybrid vehicle and a power source installation which is utilized for battery charge, in this embodiment, are substantially the same as in the first embodiment, but the control of a PLC unit disposed on the plug-in hybrid vehicle and the control of the power-source-side battery charge monitoring device disposed on the power source installation are different.

Figure 9:
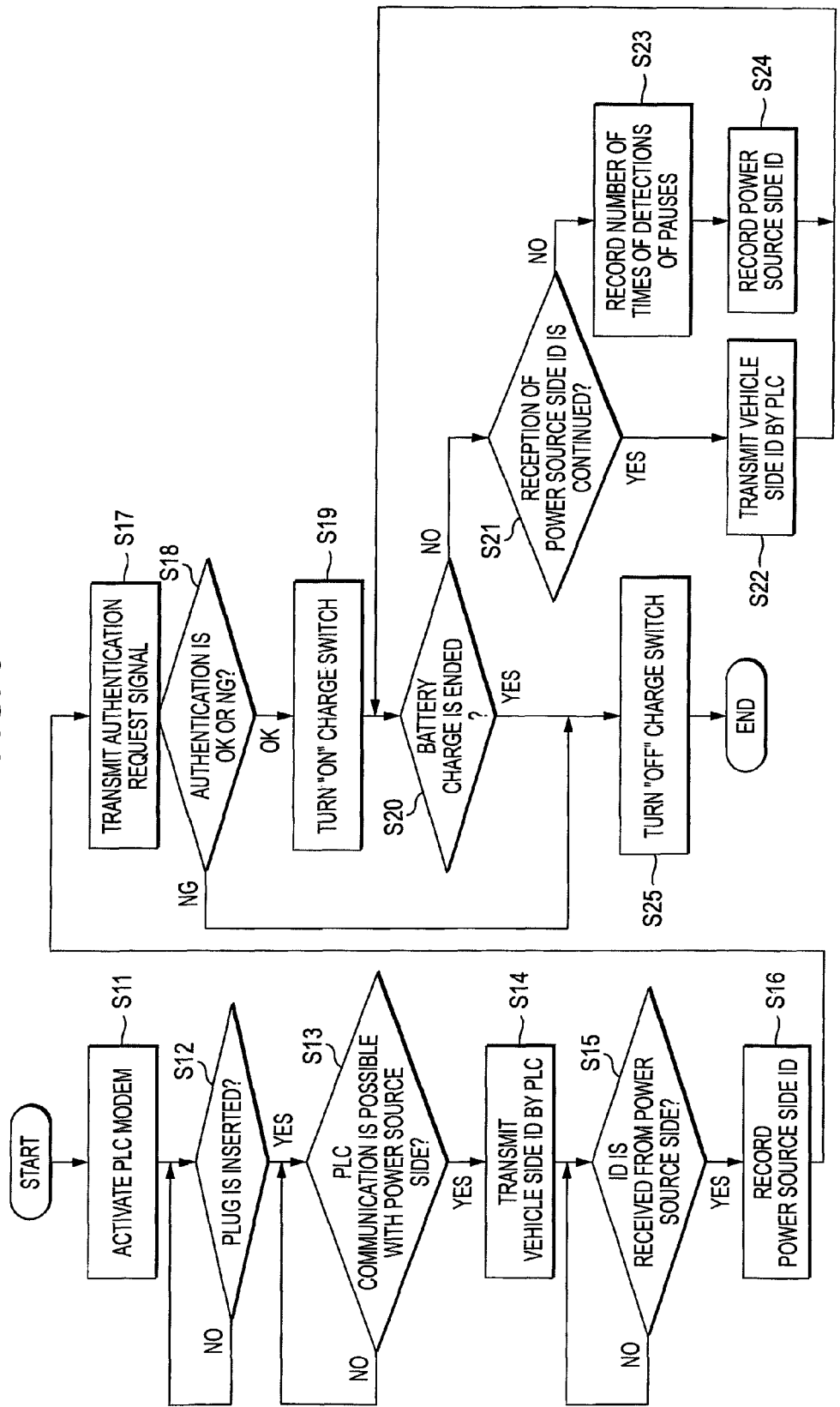
FIG. 9 is a flow chart showing the contents of the control of a PLC unit which is disposed on a plug-in hybrid vehicle side according to a second embodiment.
Figure 10:
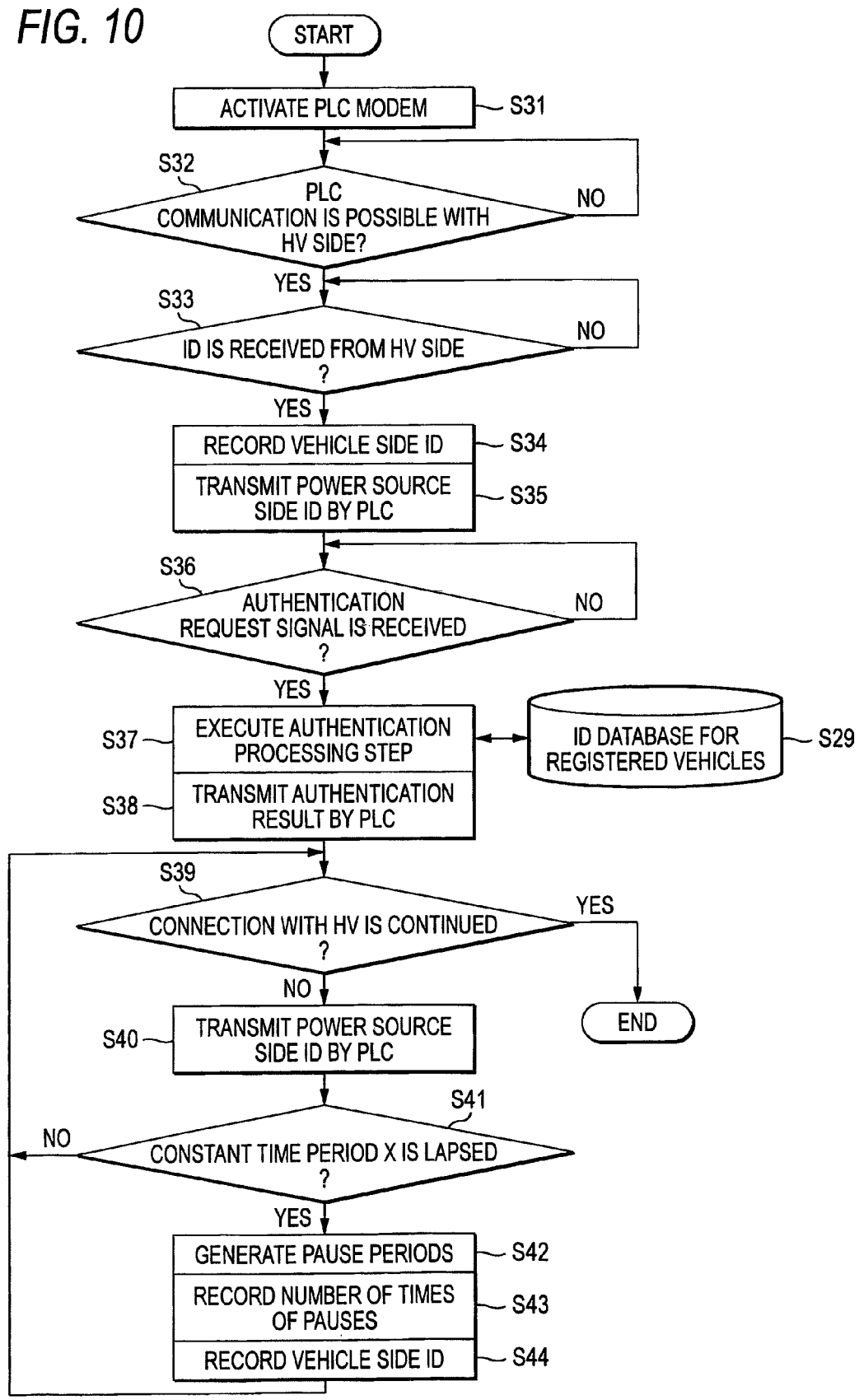
FIG. 10 is a flow chart showing the contents of the control of a power-source-side battery charge monitoring device which is disposed on a power source installation side according to the second embodiment.

FIG. 9 is a flow chart showing the contents of the control of the PLC unit which is disposed on the side of the plug-in hybrid vehicle according to the second embodiment. FIG. 10 is a flow chart showing the contents of the control of the power-source-side battery charge monitoring device which is disposed on the side of the power source installation according to the second embodiment.

In this embodiment, a personal computer 26 further includes an ID database 29 for registered vehicles as is necessary for authentication.

The operation of the PLC unit 14 will be described below with reference to FIG. 9. Incidentally, the processing steps of steps S11 to S16 and steps S19 to S25 in FIG. 9 are the same as those of the steps S11 to S16 and the steps S19 to S25 in FIG. 3.

At a step S17 in FIG. 9, in order to obtain the permission of use of the power source installation 20, a control portion 142 sends a predetermined authentication request signal to the power-source-side battery charge monitoring device 22 as a PLC signal by a PLC modem 141.

At a step S18, the control portion 142 monitors the reception state of the PLC modem 141, that is, a response signal from the power-source-side battery charge monitoring device 22 as is responsive to the authentication request signal, thereby to examine a response from the power-source-side battery charge monitoring device 22 as is responsive to the authentication request signal sent at the step S17 (in other words, whether the authentication has succeeded or failed). Thus, whether the result of the authentication is OK or NG can be identified. In a case where the result of the authentication is OK, the process proceeds to the next step S19, and in a case where the result is NG, the process is ended.

Accordingly, in a case where the power-source-side battery charge monitoring device 22 connected to the power source installation 20 has failed in the authentication of the vehicle side ID, the PLC unit 14 can perform a control so as to inhibit the battery charge operation in the plug-in hybrid vehicle 10, and it can prevent the robbery of electricity. Even in a case where the plug-in hybrid vehicle 10 has performed the battery charge operation without being permitted, the information of the power source side ID remains in the battery charge history storing portion 144 on the PLC unit 14 as a history, and hence, the history can be utilized for the detection of the act of the electricity robbery.

Next, the operation of the personal computer 26 within the power-source-side battery charge monitoring device 22 connected to the power source installation 20 according to the second embodiment will be described below with reference to FIG. 10.

Incidentally, the processing steps of steps S31 to S35 and steps S39 to S44 in FIG. 10 are the same as those of the steps S31 to S35 and the steps S39 to S44 in FIG. 4.

At a step S36 in FIG. 10, the personal computer 26 is monitoring the reception state of a PLC modem 25, and it checks whether an authentication request signal making a request for the permission of use of the power source installation 20 has been received from the PLC unit 14 on the plug-in hybrid vehicle 10. When the authentication request signal has been received, the control flow proceeds to the next step S37.

At the step S37, the personal computer 26 utilizes an ID database 29 prepared for the authentication beforehand, and it examines whether or not an ID is matched with a vehicle side ID received at the step S33 exists on the ID database 29. On the ID database 29, vehicle side IDs indicating vehicles, which are permitted by the owner or rightful person of the power source installation 20 previously to be fed with electric power, are registered beforehand. Incidentally, the ID database 29 is created in, for example, an HDD provided in the personal computer 26.

Accordingly, in a case where the ID which is matched with the vehicle side ID received at the step S33 exists on the ID database 29, the authentication request signal received at the step S36 can be accepted. The authentication result of "authentication OK" is transmitted as a PLC signal from the PLC modem 25 at the next step S38. In a case where the ID which is matched with the vehicle side ID received at the step S33 is not existed on the ID database 29, the authentication request signal received at the step S36 cannot be accepted, and hence, the authentication result of "authentication NG" is transmitted as a PLC signal from the PLC modem 25 at the next step S38. Owing to the transmission of the authentication result of "authentication OK", the battery charge operation can be started on the side of the plug-in hybrid vehicle 10 in accordance with the control of the PLC unit 14.

By the way, in this embodiment, the authentication process is executed by utilizing the ID database 29 in which the IDs to be permitted are registered beforehand. However, in a case, for example, where a fee collection device, an accounting device, or the like is connected to the power source installation 20, it may be determined that the vehicle side ID received by the power-source-side battery charge monitoring device 22 is the ID to be permitted by inquiring of the fee collection device or the accounting device about the vehicle side ID through, for example, a network.

By the way, in the case where the charge switch SW is included on the plug-in hybrid vehicle 10 as in the configuration shown in FIG. 1, the battery charge operation is inhibited on the plug-in hybrid vehicle 10 unless the power-source-side battery charge monitoring device 22 transmits the authentication result of "authentication OK" in response to the authentication request signal from the PLC unit 14. Even in a case where the plug-in hybrid vehicle 10 did not perform the battery charge operation, the information of the power source ID is recorded as a history on the battery charge history storing portion 144. In such a case where the owner or the like of the plug-in hybrid vehicle 10 attempted to perform the act of electricity robbery from the power source installation 20, an authentication result becomes "authentication NG", and the battery charge is impossible. Therefore, the battery charging electric cable 15 is immediately detached, and regarding the history on the battery charge history storing portion 144, a very small value is recorded as the "connection time period".

By the way, in the processes shown in FIGS. 9 and 10, the PLC unit 14 on the plug-in hybrid vehicle 10 performs the control so as to transmit the "authentication request signal" for the purpose of requesting the power-source-side battery charge monitoring device 22 to give the permission, but the transmission of the authentication request signal can also be omitted. By way of example, the PLC unit 14 may well utilize the vehicle side ID transmitted first, instead of the authentication request signal, and perform a control so as to start the authentication processing step of the step S37 on the power-source-side battery charge monitoring device 22, immediately after the reception of the first vehicle side ID by the power-source-side battery charge monitoring device 22 and with the step S36 omitted.

Incidentally, configurational examples of signals which are transferred via the battery charging electric cable in this embodiment, and configurational examples of information which is retained in the battery charge history storing portion are substantially the same as in the first embodiment, so that they shall be omitted from description.

Although the present invention has been described in detail and with reference to the specified embodiments, it will be obvious to those skilled in the art that various alterations and modifications can be made without departing from the spirit and scope or intended scope of the invention.

This application is based upon Japanese Patent Application No. 2008-175615, filed Jul. 7, 2008, and Japanese Patent Application No. 2008-175616, filed Jul. 4, 2008, the entire contents of which are incorporated herein by reference.

What is claimed is:

1. A battery charge monitoring device for monitoring feed of electric power from a power source installation to a battery, the power source installation being disposed separately from a vehicle on which the battery is mounted, and the vehicle using the electric power fed from the battery as a drive source for traveling, the battery charge monitoring device comprising:

a vehicle storage portion which stores therein vehicle identification information allotted to the vehicle;

a vehicle side communication portion which performs a power line communication with a power source side communication portion of the power source installation through a power line for feeding the electric power from the power source installation to the battery;

a vehicle side control portion which controls the vehicle side communication portion so as to transmit the vehicle identification information stored in the vehicle storage portion to the power source side communication portion, when a communication channel is established between the power source side communication portion and the vehicle side communication portion; and a vehicle-side battery charge history storing portion which stores therein power source identification information allotted to the power source installation, wherein the vehicle side control portion stores the power source identification information which is received from the power source side communication portion through the vehicle side communication portion, in the vehicle-side battery charge history storing portion, when the communication channel is established between the power source side communication portion and the vehicle side communication portion.

2. The battery charge monitoring device according to claim 1, further comprising:

a driver circuit which drives a charge switch to short-circuit or open a part of the power line in order to change-over ON/OFF of the feed of the electric power to the battery, wherein the vehicle side control portion outputs a control signal instructive of the opening of the charge switch, to the driver circuit, when the power source identification information is not received from the power source side communication portion by the vehicle side communication portion.

3. The battery charge monitoring device according to claim 1, wherein the vehicle-side battery charge history storing portion stores therein the power source identification information and the number of times of receiving the power source identification information transmitted cyclically from the power source side communication portion.

4. The battery charge monitoring device according to claim 1, further comprising:

a driver circuit which drives a charge switch to short-circuit or open a part of the power line in order to change-over ON/OFF of the feed of the electric power to the battery, wherein an authentication request signal which contains the vehicle identification information stored in the vehicle storage portion is transmitted to the power source side communication portion; and the vehicle side control portion outputs a control signal instructive of the short-circuiting or opening of the charge switch, to the driver circuit, in accordance with a response signal which notifies an authentication success or an authentication failure responsive to the authentication request signal and which is received from the power source side communication portion by the vehicle side communication portion.

5. A battery charge monitoring device for monitoring feed of electric power from a power source installation to a battery, the power source installation being disposed separately from a vehicle on which the battery is mounted, and the vehicle using the electric power fed from the battery as a drive source for traveling, the battery charge monitoring device comprising:

a power-source-side battery charge history storing portion which stores therein vehicle identification information allotted to the vehicle;

a power source side communication portion which performs a power line communication with a vehicle side communication portion of the vehicle through a power line for feeding the electric power from the power source installation to the battery; and a power source side control portion which stores the vehicle identification information received from the vehicle by the power source side communication portion, in the power-source-side battery charge history storing portion, when a communication channel is established between the vehicle side communication portion and the power source side communication portion.

6. The battery charge monitoring device according to claim 5, further comprising:

a power source storage portion which stores therein power source identification information allotted to the power source installation, wherein the power source side control portion controls the power line communication so as to transmit the power source identification information stored in the power source storage portion, to the vehicle-side power line communication portion, when the communication channel is established between the vehicle side communication portion and the power source side communication portion.

7. The battery charge monitoring device according to claim 5, wherein the power-source-side battery charge history storing portion stores therein the vehicle identification information and the number of times of receiving the vehicle identification information transmitted cyclically from the vehicle side communication portion.

8. The battery charge monitoring device according to claim 5, further comprising:

a vehicle identification information database which stores therein registered vehicle identification information for identifying the vehicle which is permitted to feed the electric power from the power source installation, wherein when an authentication request signal containing the vehicle identification information is received from the vehicle when the communication channel is established between the vehicle side communication portion and the power source side communication portion, the power source side control portion discriminates whether or not the registered vehicle identification information stored in the vehicle identification information database is matched with the vehicle identification information contained in the authentication request signal, and controls the power source side communication portion so as to transmit a response signal for notifying an authentication success or an authentication failure based on a result of the discrimination, to the vehicle side communication portion.

* * * * *